Figure 1:
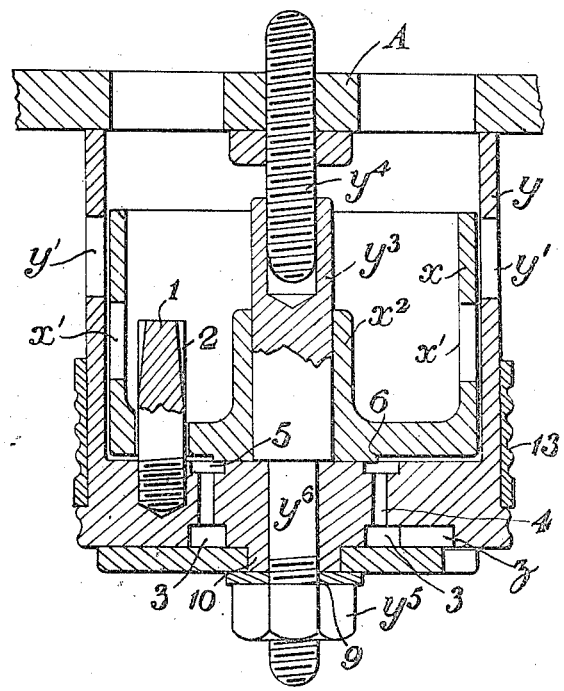

J. A. TORRENS.
AUXILIARY AIR INLET VALVE FOR GAS ENGINES.
APPLICATION FILED AUG. 30, 1916.

1,239,639.

Patented Sept. 11, 1917.

John Arthur Torrens
Inventor
per: Fraser, Turk & Myers
Attorneys

UNITED STATES PATENT OFFICE.

JOHN ARTHUR TORRENS, OF SOMERSET, COLERAINE, IRELAND.

AUXILIARY AIR-INLET VALVE FOR GAS-ENGINES.

1,239,639.

Specification of Letters Patent.

Patented Sept. 11, 1917.

Application filed August 30, 1916. Serial No. 117,609.

*To all whom it may concern:*

Be it known that I, JOHN ARTHUR TORRENS, of Somerset, Coleraine, in the county of Londonderry, Ireland, major late Scots Greys, a subject of the King of Great Britain and Ireland, have invented a certain new and useful Auxiliary Air-Inlet Valve for Gas-Engines, of which the following is a specification.
This invention relates to carbureters for internal combustion engines and has for its object to provide an improved construction of air supply valve, of the kind where a cup shaped lantern valve is subject to the suction of the engine and is controlled by a dash pot device. One object among others of my present invention is to provide an air valve particularly adapted but not limited to carbureters where the engine may be run on either petrol alone or a mixture of petrol with cheaper oil such as paraffin whereby the cost of fuel is very considerably reduced.

I have ascertained by experiments that when a mixture of petrol with a cheaper oil such as paraffin is used a larger proportion of air is required to obtain complete combustion than is necessary for petrol alone, and the improved device provides means for supplying the requisite quantity of air in right proportion varying with the requirements of the engine.

My improved air supply valve consists of a cup or plunger shaped valve with ports in its sides and adapted to slide with a loose or very free fit in a cylinder also provided with ports.

The movement of the valve in the cylinder is controlled by a dash pot arrangement which is preferably adjustable, and the valve is further guided and regulated by an auxiliary guiding pin projecting through a hole in the valve and tapered or equivalently formed, so as to increase the outlet of air from within the dash pot space as the valve rises.

The cup or plunger is preferably made as light as possible and so fitted that the resistance of the valve itself apart from the devices which control its movements is reduced to a minimum, thereby increasing its efficient range of action over a wide range of running conditions.

The valve may be said to be a very light valve as free as possible from friction and supported on a regulatable column of air provided by the dash pot arrangements.

The air admission port which controls the lift of the air valve may consist of a hole of suitable dimensions over which slides a shutter like cut off device preferably having an eccentric movement or a movement oblique to the cut off face or edge whereby the effective dimensions of the controlling air inlet may be regulated minutely with ease. Means are provided to set the shutter in position and indicating marks or a scale are preferably provided to show the exact position of the parts.

Figure 2:
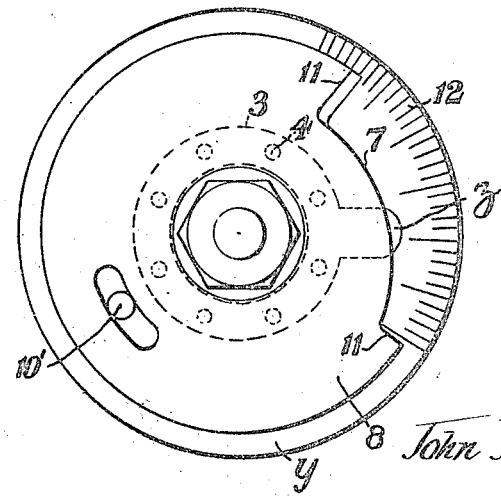

Figs. 1 and 2 of the accompanying drawings show in sectional elevation and inverted plan one combination of air valve made in accordance with this invention.

In the construction shown, the air supply valve consists of a cup shaped valve $x$ subject to the suction of the engine. The said cup is provided with ports $x'$ and is made to slide with a loose fit in the cylinder $y$ which is also provided with ports $y'$. The cup $x$ is made as light as possible and such an easy fit in the cylinder $y$ as to reduce friction to a minimum, and for this purpose the cup is guided by a sleeve $x^2$ sliding on a central guiding pin $y^3$, the upper end of which may be screwed to serve as a means for attaching the air valve cylinder to the vaporizer or induction pipe of the engine as the case may be. For example, the central guiding pin $y^3$ may be screwed onto a double ended screw pin $y^4$ screwed into the vaporizer A and fastened in position by a lock nut $y^5$. The central guiding pin $y^3$ may be formed with a shoulder and a reduced part $y^6$ which extends down through the base of the cylinder and is adapted to receive the lock nut $y^5$ for securing the same in place.

As alternatives which do not call for illustration the air valve cylinder may be fastened in position by a flange attachment by screwing the top end of the cylinder or in any other suitable manner.

As an auxiliary controlling device and in order to prevent any tendency of the plunger $x$ to rotate during its rising and falling movements a controlling guide pin $l$ is fitted passing down through the base of the cup $x$ into the base of the cylinder and the upper end of this pin $l$ is coned or fluted in a suitable manner as at 2 so that as the cup $x$ lifts the air passage provided between the side of the guiding pin and the hole in the cup may be enlarged. The said fluted pin thus also serves as a means for adjusting the lift of the cup shaped valve for which purpose the dimensions and length of the fluting in the sides of the pin which taper away toward the base may be altered as required.

The air inlet to the space between the cup $x$ and the base of the cylinder consists of an annular groove 3 in the base of the cylinder having a number of passages 4 communicating with a corresponding groove 5 formed in the inner surface of the cylinder base on which the cup shaped valve rests to distribute the air uniformly over the base of the valve and thereby steady its movement, and the base of the cup $x$ may be formed with a shoulder such as 6 near the center so as to leave a clearance for the admission of air to the space between the cup and the cylinder walls, which space as before mentioned provides an easy fit for the cup shaped valve. The annular groove 3 in the base of the cylinder is extended by an outwardly extending radial groove with rounded end, forming the inlet $z$ over which extension slides an eccentric face 7 on a regulated disk 8 which covers the remainder of the annular groove and for which purpose it fits with a faced joint against the base of the cylinder $y$ and is secured thereto by the lock nut $y^5$ on the central pin; a suitable washer 9 and a shoulder 10 are provided to enable the disk to be rotated for adjustment purposes when required. The extent of the movement of the regulating disk 8 is determined by a pin and slot 10'.

The eccentric cut off face 7 on the disk 8 which regulates the opening of the air inlet port may be set back as shown from the edge of the disk by cutting away a portion thereof and the radially extending ends 11, 11 at the end of the gap may serve as an indicator moving over a scale such as 12 on the base of the cylinder to indicate exactly the amount of the air inlet to which the disk has been adjusted. It will be seen that the eccentric curved face 7 of the disk 8 will move over the rounded end of the air inlet $z$ and closes the same by a shutter like action moving in a direction oblique to the said cut off face and thereby give a very fine adjustment.

The air ports $x'$ of the cup shaped valve $x$ will be of sufficient number arranged in a circle and will come below the corresponding ports $y'$ in the cylinder when the cup is at rest. In order that the air inlet ports may be closed when starting the engine when cold, a sliding sleeve 13 may be fitted on the outside of the cylinder and adapted to be moved over the valve openings. The said sleeve may be a split sleeve adapted to have a grip on the outer wall of the cylinder and thereby remain in the position to which it is moved.

It will be obvious without illustration that the above mentioned regulating valve may be alternatively constructed with the rising and falling cup placed outside of the fixed cylindrical part and adapted to slide up and down on the outside of the said fixed cylindrical part which will form a guide, suitable means being provided to keep the sliding cup in position.

The controlling ports and the auxiliary guiding and controlling port will be fitted in either the cylinder or the cup, so as to perform the function referred to.

What I claim and desire to secure by Letters Patent is:—

A carbureter for internal combustion engines comprising a cylinder, ports in said cylinder, a cup-shaped valve disposed in said cylinder, ports in said cup-shaped valve, said cup-shaped valve being adapted to close the ports in the cylinder when the engine is not working, said cup-shaped valve rising when subject to the suction of the engine to open the ports in the cylinder and controlled by dash pot action, a pin projecting from the base of the cylinder and passing through a hole in the base of the cup-shaped valve, means whereby the space between the pin and the edge of the hole varies with the movement of the valve so as to vary the release of air from and admission of air to the space between the base of the cup-shaped valve and the cylinder so as to affect the action of the dash pot and the valve as the latter rises, and a shutter-like device disposed at the base of the cylinder for adjusting the air supply to the said space between the said valve and cylinder.

In witness whereof, I have hereunto signed my name in the presence of two subscribing witnesses.

JOHN ARTHUR TORRENS.

Witnesses:
HENRY ALLEN RYE,
ROBERT MILTON SPEARPOINT.